(12) United States Patent
Godwin et al.

(10) Patent No.: US 7,684,409 B2
(45) Date of Patent: Mar. 23, 2010

(54) EFFICIENT MESSAGE DELIVERY IN A MULTI-CHANNEL UNI-DIRECTIONAL COMMUNICATIONS SYSTEM

(75) Inventors: John P. Godwin, Los Angeles, CA (US); Stephen P. Dulac, Santa Clarita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1629 days.

(21) Appl. No.: 10/866,291

(22) Filed: Jun. 10, 2004

(65) Prior Publication Data

US 2005/0276257 A1    Dec. 15, 2005

(51) Int. Cl.
*H04L 12/28* (2006.01)
(52) U.S. Cl. .................. 370/395.4; 370/431; 370/468; 370/433; 345/719; 375/363; 348/423.1
(58) Field of Classification Search ............ 370/395.4, 370/395.42, 431, 468, 433, 437, 95.4; 345/719, 345/717, 718; 375/363, 371; 348/423.1
See application file for complete search history.

(56) References Cited

U.S. PATENT DOCUMENTS

| | | | |
|---|---|---|---|
| 5,663,715 A * | 9/1997 | Godoroia | 340/825.2 |
| 5,682,382 A * | 10/1997 | Shepard | 370/342 |
| 5,699,361 A * | 12/1997 | Ding et al. | 370/431 |
| 5,715,315 A | 2/1998 | Handelman | |
| 5,761,602 A * | 6/1998 | Wagner et al. | 725/34 |
| 5,774,170 A | 6/1998 | Hite et al. | |
| 5,838,369 A * | 11/1998 | Aoki et al. | 348/223.1 |
| 5,998,680 A * | 12/1999 | Kiefer et al. | 568/906 |
| 6,005,602 A | 12/1999 | Matthews, III | |
| 6,023,230 A * | 2/2000 | Dorenbosch et al. | 340/7.24 |
| 6,348,932 B1 * | 2/2002 | Nishikawa et al. | 715/719 |
| 6,388,715 B1 * | 5/2002 | Eggen et al. | 348/569 |
| 6,577,861 B2 * | 6/2003 | Ogasawara | 455/419 |
| 7,024,482 B2 * | 4/2006 | Hlasny | 709/227 |
| 7,079,497 B2 * | 7/2006 | Miura et al. | 370/282 |
| 2002/0069413 A1 | 6/2002 | Levitan | |
| 2002/0122427 A1 * | 9/2002 | Kamentsky et al. | 370/395.4 |
| 2005/0086306 A1 * | 4/2005 | Lemke | 709/206 |
| 2007/0104138 A1 * | 5/2007 | Rudolf et al. | 370/329 |

FOREIGN PATENT DOCUMENTS

JP              58091567 A  *  5/1983

* cited by examiner

*Primary Examiner*—Minh D Dao

(57) ABSTRACT

A method and system for efficiently delivering messages from a service provider to individual receiving devices in a unidirectional, multi-channel communications system that provides parallel distribution of information from the service provider to the receiving devices. The messages are transferred from the service provider to the receiving device only on an agreed-upon channel at an agreed-upon time, wherein each message is tagged with an address corresponding to the receiving device by the service provider and then transmitted by the service provider to the receiving device on the agreed-upon channel with the receiving device filtering the agreed-upon channel to detect the address and decode its messages. The agreed-upon channel and the agreed-upon time of message transfers are coordinated between the service provider and the receiving device prior to transferring the message from the service provider to the receiving device.

50 Claims, 7 Drawing Sheets

EFFICIENT MESSAGE DELIVERY IN A MULTI-CHANNEL UNI-DIRECTIONAL COMMUNICATIONS SYSTEM

BACKGROUND OF THE INVENTION

1. Field of the Invention

The present invention relates to methods and systems for efficient message delivery in a multi-channel uni-directional communications system.

2. Description of the Related Art

Media delivery systems, such as direct broadcast satellite and cable systems, have become commonplace in recent years. A media delivery system is an example of a "uni-directional" system, in that communication is primarily uni-directional.

Media delivery systems are also generally defined as "multi-channel" communications systems, in that a given message may take one or many of several parallel paths from origin to destination. Examples of such multi-channel communications systems include a direct broadcast satellite system with multiple transponders or a cable system with multiple channels in frequency division.

In current direct broadcast satellite systems, a Conditional Access Packet (CAP) data stream is typically used to distribute user-specific messages to receiving devices, such as emails, authorizations and the like. A "message" in this context is any information transmission that has a finite total size, e.g., an email message, but not a continuous audio/video data stream.

However, the distribution of user-specific messages requires the use of a multi-channel message "flood" in order to ensure message deliver to the receiving devices. In such a flood, the system sends all messages, even individually addressed messages, over multiple paths of the system at the same time, because it is not known which path is being "listened to" by the receiving device. Each individually addressed message is tagged with a unique address for the receiving device and then transmitted repeatedly on each channel with each receiving device filtering at least one channel to detect its unique address and hence decode its messages.

However, the CAP data stream has limited bandwidth in a typical direct broadcast satellite system and cannot be increased because of system legacy issues. Thus, there is a need in the art for more efficient message delivery in a multi-channel unidirectional communications system. "Efficiency" in this context is used to mean moving the message reliably from the origin to the destination with the least consumption of channel capacity. The present invention provides such efficiencies, which equate to effective increases in available capacity for new services using the fixed system capacity.

SUMMARY OF THE INVENTION

In summary, the present invention describes a method and system for efficiently delivering messages from a service provider to individual receiving devices in a uni-directional, multi-channel communications system that provides parallel distribution of information from the service provider to the receiving devices. The messages are transferred from the service provider to the receiving device only on an agreed-upon channel at an agreed-upon time, wherein each message is tagged with an address corresponding to the receiving device by the service provider and then transmitted by the service provider to the receiving device on the agreed-upon channel with the receiving device filtering the agreed-upon channel to detect the address and decode its messages. The agreed-upon channel and the agreed-upon time of message transfers are coordinated between the service provider and the receiving device prior to transferring the message from the service provider to the receiving device.

BRIEF DESCRIPTION OF THE DRAWINGS

Referring now to the drawings in which like reference numbers represent corresponding parts throughout:

FIGS. 7A and 7B are flowcharts illustrating a method of efficiently delivering messages to individual IRDs in a unidirectional, multi-channel communications system that provides parallel distribution of information to the receiving devices according to the preferred embodiment of the present invention, wherein FIG. 7A illustrates how the service provider transmits messages to the IRDs and FIG. 7B illustrates how the IRDs receive messages from the service provider.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

The present invention uses a multi-channel uni-directional communications system to provide efficient message delivery from a service provider to one or more receiving devices. These improvements in efficiency equate to effective increases in available capacity for new services in the system.

In contrast to the current method of sending even individually-addressed messages using a message flood over all channels, the present invention utilizes only a single channel at a specific time for an individually-addressed message. This is accomplished by coordinating an agreed-upon channel and agreed-upon time for message delivery between the service provider and the receiving device.

However, there exists a problem in that other services may be interrupted or lost when the receiving device tunes away from its current channel to the agreed-upon channel at the agreed-upon time. Nonetheless, the present invention includes means for mitigating the loss of these services.

Another disadvantage is that the present invention requires additional complexity for both the service provider and the receiving device. However, the improvement in efficiency is believed to outweigh this disadvantage.

Direct Broadcast Satellite System

Figure 1:
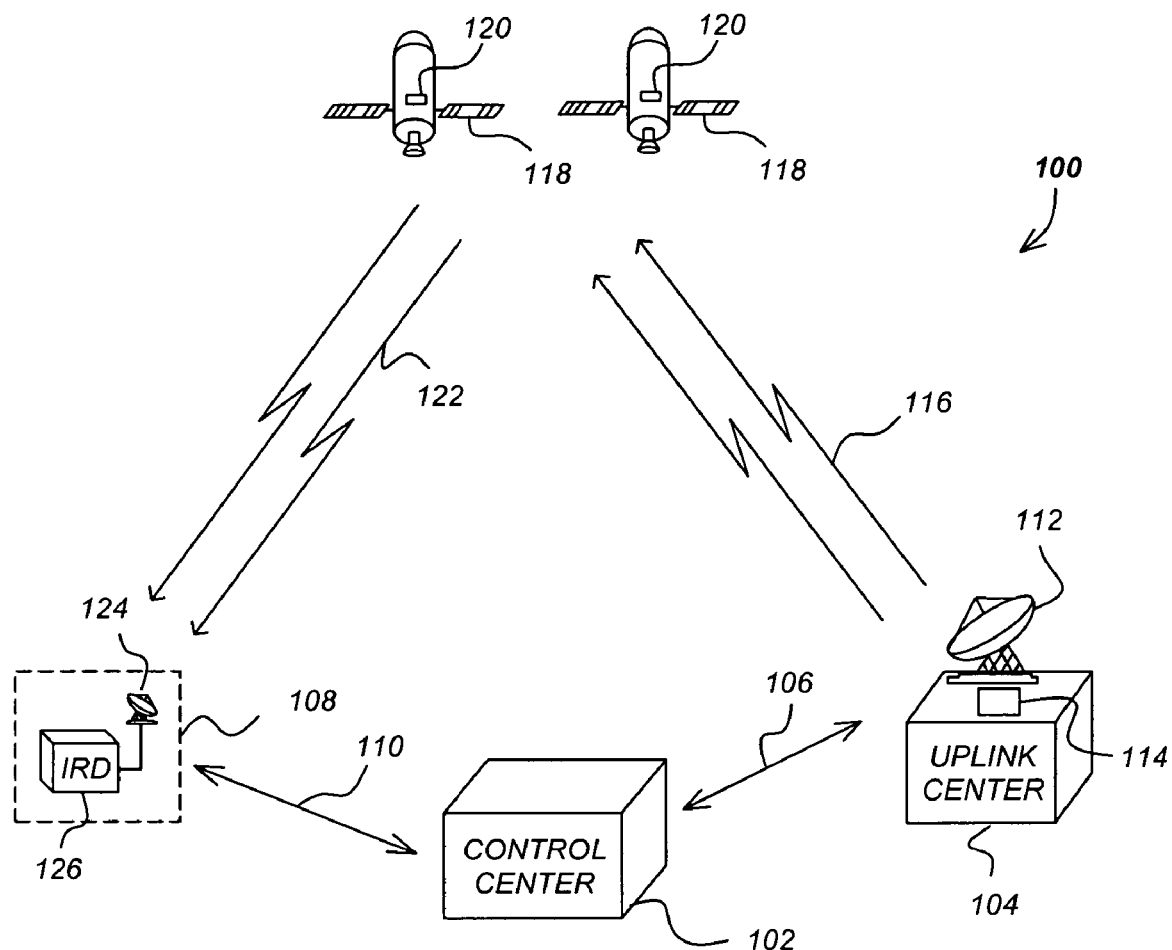
FIG. 1 is a diagram illustrating an overview of a direct broadcast satellite system according to a preferred embodiment of the present invention.

FIG. 1 is a diagram illustrating an overview of a direct broadcast satellite system 100 according to a preferred embodiment of the present invention. The system 100 includes a control center 102 operated by a service provider in communication with an uplink center 104 via a link 106 and with customer receiving stations 108 via an occasionally connected link 110. The control center 102 provides program materials to the uplink center 104 and coordinates with the customer receiving stations 108 to offer various services, including key management for encryption and decryption, pay-per-view (PPV), billing, etc.

The uplink center 104 receives the program materials from the control center 102 and, using an uplink antenna 112 and transmitter 114, transmits the program materials via uplink 116 to one or more satellites 118, each of which may include one or more transponders 120. The satellites 118 receive and process this program material, and re-transmit the program materials to customer receiving stations 108 via a continuous downlink 122 using transponder 120. Customer receiving stations 108 receive the program materials from the satellites 118 via an antenna 124, and decrypt and decode the program materials using a receiving device 126, such as an integrated receiver/decoder (IRD) 126.

Uplink Configuration

Figure 2:
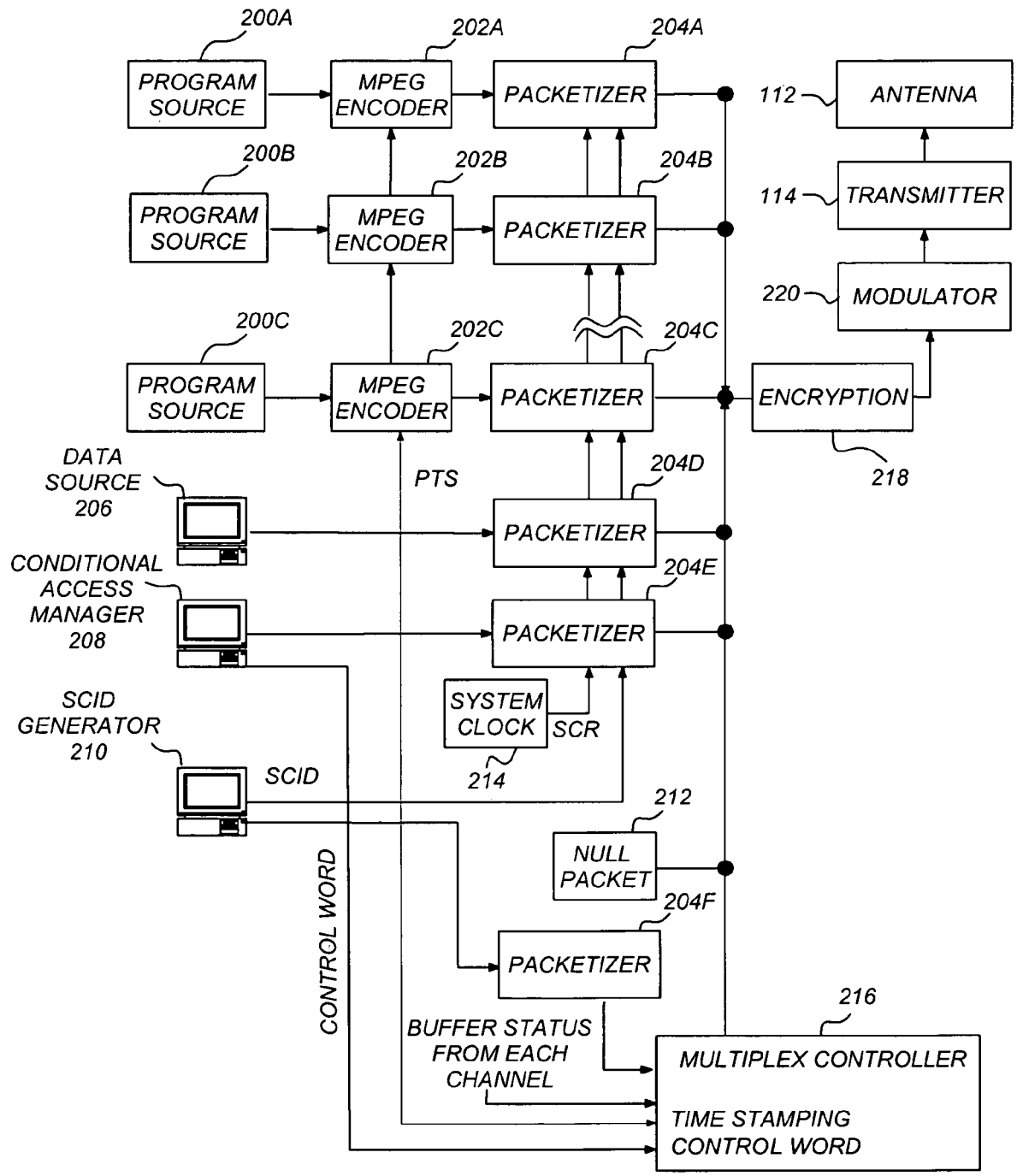
FIG. 2 is a block diagram showing a typical uplink configuration for a single satellite transponder, showing how program materials and program control information are uplinked to the satellite by the control center and the uplink center.

FIG. 2 is a block diagram showing a typical uplink center 104 configuration for a single transponder 120, showing how program materials and program control information are uplinked to the satellite 118 by the control center 102 and the uplink center 104.

One or more channels are provided by program sources 200A-200C, which may comprise one or more video channels augmented respectively with one or more audio channels.

The data from each program source 200A-200C is provided to a corresponding encoder 202A-202C, which in one embodiment comprise Motion Picture Experts Group (MPEG) encoders, although other encoders can be used as well. After encoding by the encoders 202A-202C, the output therefrom is converted into data packets by corresponding packetizers 204A-204C.

In addition to the program sources 200A-200C, data source 206 and conditional access manager 208 may provide one or more data streams for transmission by the system 100. The data from the data source 206 and conditional access manager 208 is provided to corresponding packetizers 204D-204E.

A system channel identifier (SCID) generator 210, null packet (NP) generator 212 and system clock 214 provide control information for use in constructing a data stream for transmission by the system 100. Specifically, the packetizers 204A-204F assemble data packets using a system clock reference (SCR) from the system clock 214, a control word (CW) generated by the conditional access manager 208, and a system channel identifier (SCID) from the SCID generator 210 that associates each of the data packets that are broadcast to the customer with a program channel.

Each of the encoders 202A-202C also accepts a presentation time stamp (PTS) from a multiplex controller 216. The PTS is a wrap-around binary time stamp that is used to assure that the video channels are properly synchronized with the audio channels after encoding and decoding.

Finally, these data packets are then multiplexed into a serial data stream by the controller 216. The data stream is then encrypted by an encryption module 218, modulated by a modulator 220, and provided to a transmitter 114, which broadcasts the modulated data stream on a frequency bandwidth to the satellite 118 via the antenna 112.

Representative Data Stream

Figure 3A:
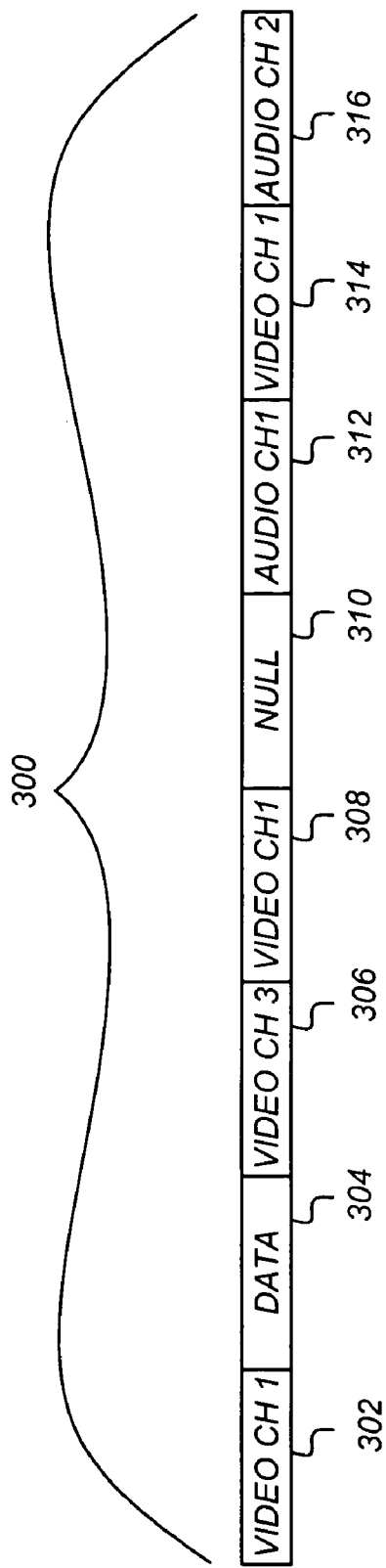
FIG. 3A is a diagram of a representative data stream according to the preferred embodiment of the present invention.

FIG. 3A is a diagram of a representative data stream 300 according to the preferred embodiment of the present invention. The first packet 302 comprises information from video channel 1 (data coming from, for example, the first program source 200A); the second packet 304 comprises computer data information (that was obtained, for example, from the computer data source 206 or conditional access manager 208); the third packet 306 comprises information from video channel 3 (from the third program source 200C); the fourth packet 308 includes information from video channel 1 (from the first program source 200A); the fifth packet 310 includes a null packet (from the NP generator 212); the sixth packet 312 includes information from audio channel 1 (from the first program source 200A); the seventh packet 314 includes information from video channel 1 (from the first program source 200A); and the eighth packet 316 includes information from audio channel 2 (from the second program source 200B). The data stream therefore comprises a series of packets from any one of the program and/or data sources in an order determined by the controller 216. Using the SCID, the IRD 126 reassembles the packets to regenerate the program materials for each of the channels.

Figure 3B:
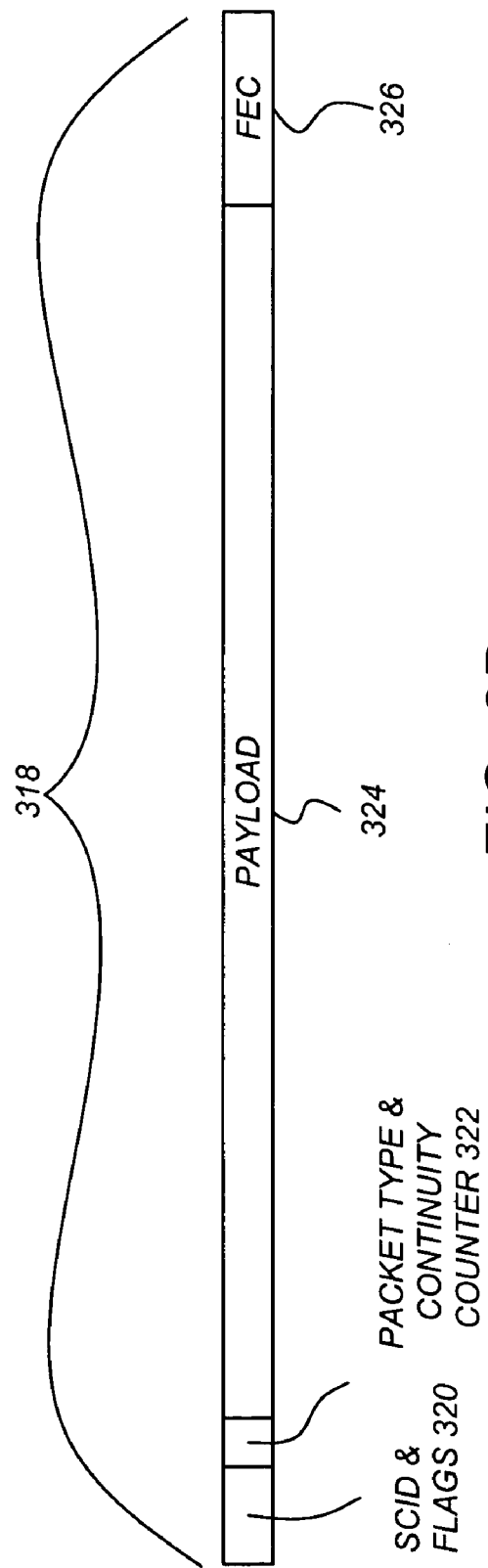
FIG. 3B is a diagram of a representative data packet according to the preferred embodiment of the present invention.

FIG. 3B is a diagram of a representative packet 318 according to the preferred embodiment of the present invention. Each packet segment 318 is 147 bytes long, and comprises a number of packet segments 320-326. The first segment 320 comprises two bytes of information containing the SCID and flags. The SCID is a unique 12-bit number that uniquely identifies the channel associated with the packet 318. The flags include 4 bits that are used to control whether the packet 318 is encrypted, and what key must be used to decrypt the packet 318. The second segment 322 is made up of a 4-bit packet type indicator and a 4-bit continuity counter. The packet type identifies the packet as one of the four data types (video, audio, data, or null). When combined with the SCID, the packet type determines how the packet 318 will be used. The continuity counter increments once for each packet type and SCID. The third segment 324 comprises 127 bytes of payload data. The fourth segment 326 is data required to perform forward error correction on the packet 318.

Encryption of Data Streams

As noted above, the data streams transmitted to the IRD 126 are encrypted by the encryption module 218 before transmission to ensure that they are received and viewed only by authorized IRDs 126. The data streams are encrypted according to an encryption key referred to hereinafter as a control word (CW). This can be accomplished by a variety of data encryption techniques, including symmetric algorithms, such as the data encryption standard (DES), and asymmetric algorithms, such as the Rivest-Shamir-Adleman (RSA) algorithm.

To decrypt the data streams, the IRD 126 must also have access to the associated CW. To maintain security, the CW is not transmitted to the IRD 126 in plaintext. Instead, the CW is encrypted before transmission to the IRD 126. The encrypted CW is transmitted to the IRD 126 in a control word packet (CWP), i.e., a data packet type as described in FIG. 3B.

In one embodiment, the data in the CWP, including the CW, is encrypted and decrypted via what is referred to hereinafter as an input/output (I/O) indecipherable algorithm. An I/O indecipherable algorithm is an algorithm that is applied to an input data stream to produce an output data stream. Although the input data stream uniquely determines the output data stream, the algorithm selected is such that its characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 126 share the same I/O indecipherable algorithm, the IRD 126 can decode the information in the encrypted CWP to retrieve the CW. Then, using the CW, the IRD 126 can decrypt the data streams, so that they can be displayed or otherwise presented.

Integrated Receiver/Decoder

Figure 4:
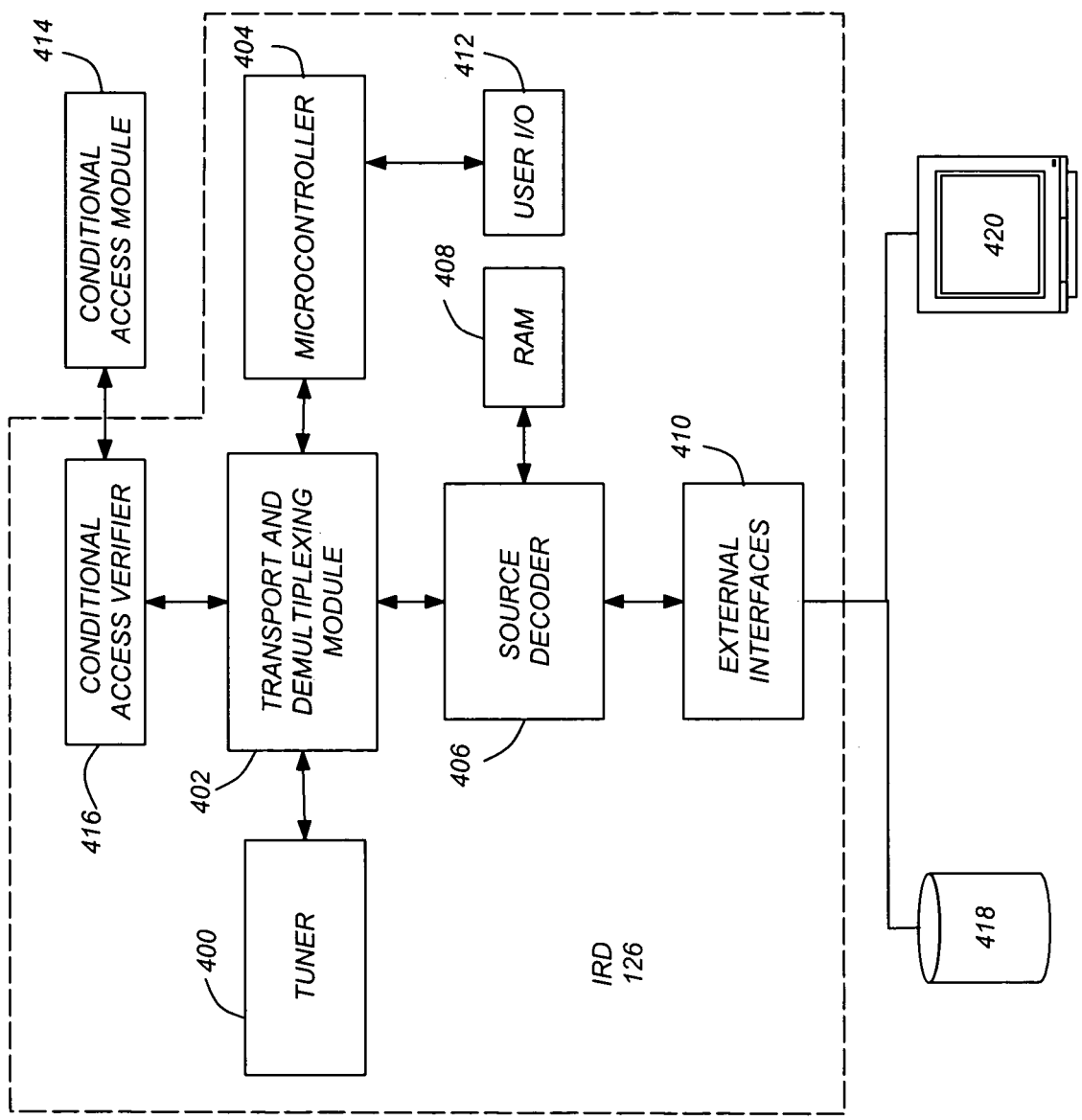
FIG. 4 is a simplified block diagram of an integrated receiver/decoder (IRD) according to the preferred embodiment of the present invention.

FIG. 4 is a simplified block diagram of an IRD 126 according to the preferred embodiment of the present invention. The IRD 126 includes a tuner 400, a transport and demultiplexing module (TDM) 402 that operates under the control of a microcontroller 404 to perform transport, demultiplexing, decryption and encryption functions, a source decoder 406, random access memory (RAM) 408, external interfaces 410, user I/O 412, a conditional access module (CAM) 414, and conditional access verifier (CAV) 416.

The tuner 400 receives the packets of the data streams from the antenna 124 and provides the packets to the TDM 402. Using the SCIDs associated with the packets, the TDM 402 and microcontroller 404 reassemble the data streams for the channel tuned by the IRD 126, and decrypt the data streams using the CW.

Once the data streams have been decrypted, they are provided to the source decoder 406, which decodes the data streams as required, e.g., using MPEG decoding and/or other decoding as appropriate. The decoded data streams may be stored in the RAM 408 or provided to devices coupled to the IRD 126 via the external interfaces 410, wherein the devices coupled to the IRD 126 can include a media storage device 418, such as a disk drive, a presentation device 420, such as a monitor, or a networked device, such as another IRD 126. Note that any of the devices could be integrated with the IRD 126.

The CAM 414 is typically implemented in a smartcard or similar device, which is provided to the customer to be inserted into the IRD 126. The CAM 414 interfaces with the CAV 416 and the TDM 402 to verify that the IRD 126 is entitled to access the data streams.

The CW is obtained from the CWP using the CAV 416 and the CAM 414. The TDM 402 provides the CWP to the CAM 414 via the CAV 416. The CAM 414 uses an I/O indecipherable algorithm to generate the CW, which is provided back to the TDM 402. The TDM 402 then uses the CW to decrypt the data streams.

Operative Pairing of the IRD and CAM

Figure 5:
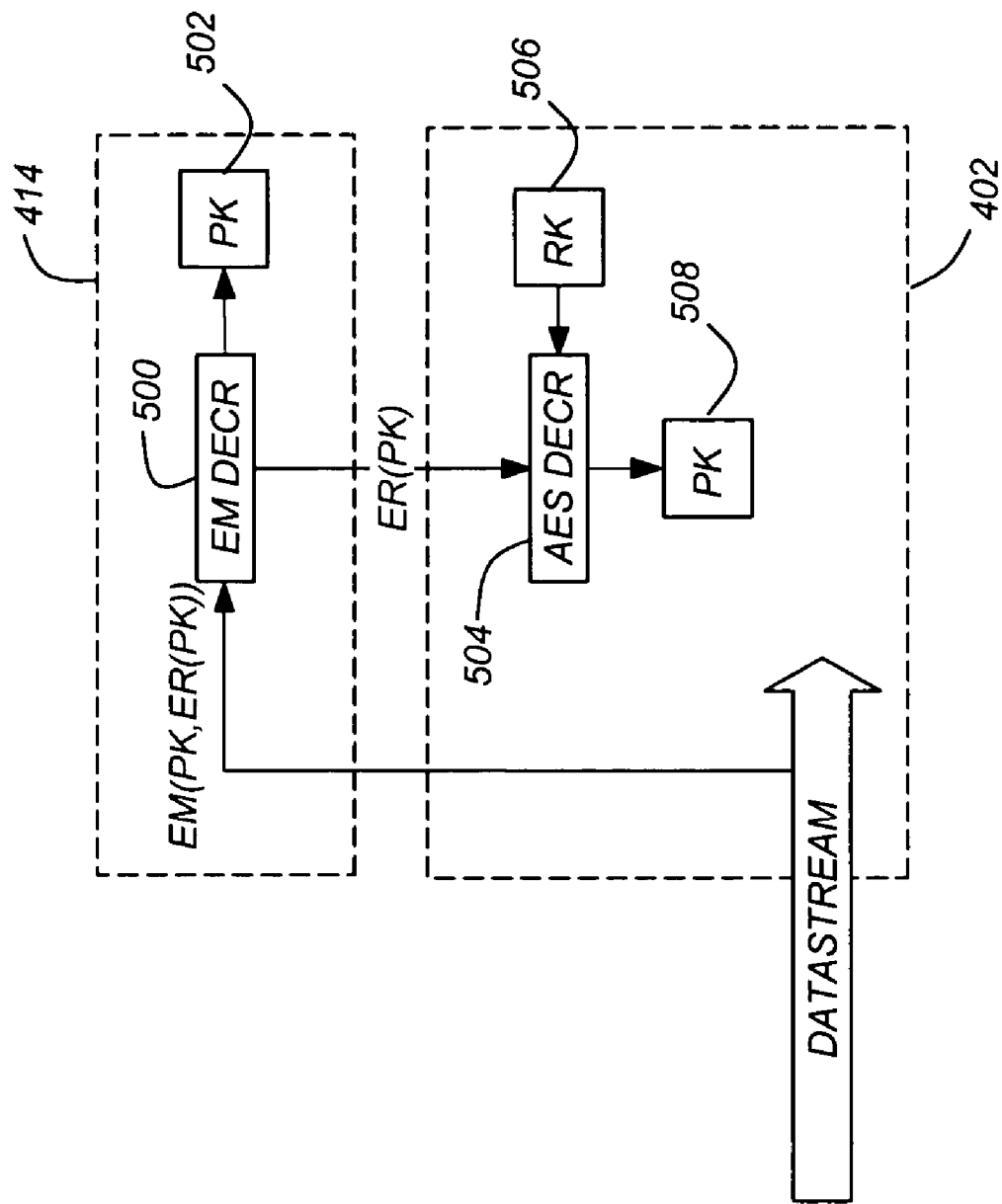
FIG. 5 is a logical flow illustrating how the IRD and CAM are operatively paired according to the preferred embodiment of the present invention.

FIG. 5 is a logical flow illustrating how the IRD 126 and CAM 414 are operatively paired according to the preferred embodiment of the present invention.

After the customer has purchased and installed the IRD 126 and associated hardware, the customer supplies a unique identifier (such as a serial number) for the IRD 126 to the service provider. The unique identifier is itself uniquely associated with a secret receiving device key (RK). This association is implemented in the IRD 126 itself, and is known to the service provider. Thereafter, the service provider determines a pairing key (PK) that will be used to encrypt communications between the CAM 414 and the IRD 126.

The PK is then encrypted by the service provider using the RK, to produce an encrypted PK, denoted ER(PK), wherein the ER( ) indicates that RK encryption is used and the PK indicates that the PK is encrypted. A message for the CAM 414 comprising the PK and the ER(PK) is generated by the service provider, and the message is encrypted using a conditional access message encryption algorithm to produce EM(PK, ER(PK)), wherein the EM( ) indicates that conditional access message encryption is used and the PK, ER(PK) indicates that the PK, ER(PK) is encrypted.

The EM(PK, ER(PK)) is then transmitted to the IRD 126 where it is received by the tuner 400 and TDM 402. The TDM 402 routes data packets with the encrypted message EM(PK, ER(PK)) to the CAM 414 for decryption.

In the CAM 414, the EM(PK, ER(PK)) is decrypted by a message decryption algorithm (EM DECR) 500 to produce the decrypted PK, which is stored in a secure memory 502 in the CAM 414. The ER(PK) is provided from the CAM 414 to the TDM 402, and since it is encrypted using the RK, it is not exposed in plaintext. (In the preferred embodiment, the ER(PK) is delivered to the TDM 402 via the CAM 414, but alternative embodiments might deliver ER(PK) directly to the TDM 402).

In the TDM 402, the ER(PK) is decrypted by an Advanced Encryption Standard (AES) decryption algorithm (AES DECR) 504 using the RK 506 to produce the decrypted PK, which is then stored in a secure memory 508. This PK, now stored in both the IRD 126 and the CAM 414, is used to encrypt communications between the CAM 414 and the IRD 126, as desired.

For example, using the PK, the CAM 414 encrypts the CW to produce EPK(CW), wherein the EPK( ) indicates that PK encryption is used and the CW indicates that the CW is encrypted. The TDM 402 decrypts the EPK(CW) received from the CAM 414. Since the EPK(CW) can only be decrypted by an IRD 126 that contains the appropriate PK, this cryptographically binds ("pairs") the CAM 414 and the IRD 126.

Receiving Messages from the Service Provider at the IRD

Figure 6:
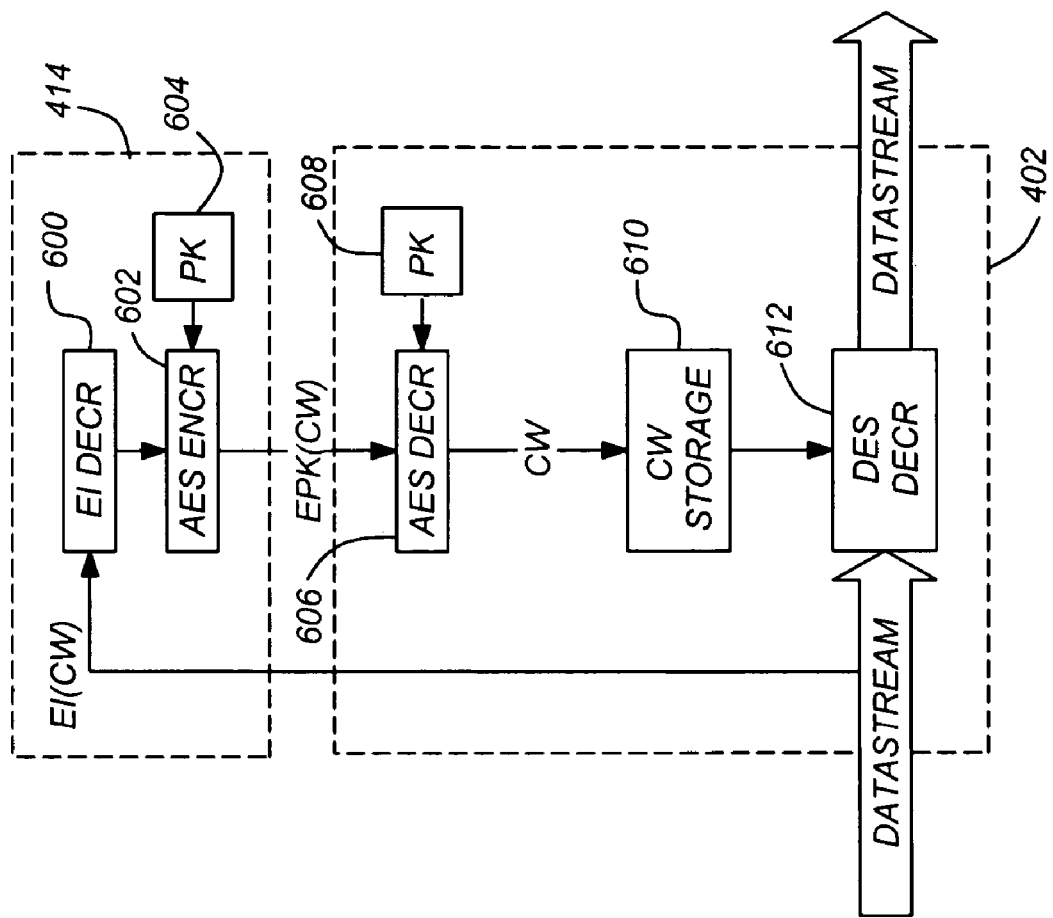
FIG. 6 is a logical flow illustrating how IRDs receive messages from the service provider according to the preferred embodiment of the present invention.

FIG. 6 is a logical flow illustrating how the IRDs 126 receive messages from the service provider according to the preferred embodiment of the present invention.

As noted above, the customer supplies a unique identifier (such as a serial number) for the IRD 126 to the service provider, wherein the unique identifier is associated with a secret receiving device key (RK). The association is implemented in the IRD 126 itself and is known to the service provider.

The service provider transmits a data stream including one or more messages to the IRD 126 using an ID that identifies the IRD 126. The IRD 126 receives the data stream including the messages, which are encrypted by the encryption key CW, as well as the encrypted encryption key EI(CW) itself. The EI(CW) is provided, via the TDM 402, to the CAM 414, where it is decrypted by an I/O indecipherable algorithm (EI DECR) 600. The result is the unencrypted encryption key CW.

The unencrypted CW is then re-encrypted by the CAM 414 by an AES encryption algorithm (AES ENCR) 602 using the PK 604 stored in the CAM 414 to produce a re-encrypted encryption key EPK(CW). The re-encrypted encryption key EPK(CW) is provided to the TDM 402, where it is decrypted by an AES decryption algorithm (AES DECR) 606 using the PK 608 stored in the TDM 402, in order to obtain the unencrypted encryption key (CW). The unencrypted CW is then stored in a CW storage 610, and used when necessary by a Data Encryption Standard (DES) decryption algorithm (DES DECR) 612 to decrypt the data stream including the messages.

The messages may be stored in encrypted or decrypted form on disk drive 418 or other non-volatile memory in the IRD 126. Any number of such encrypted or decrypted text messages can be stored in the IRD 126, according to the amount of memory available.

Efficient Delivery of Messages

Figure 7B:
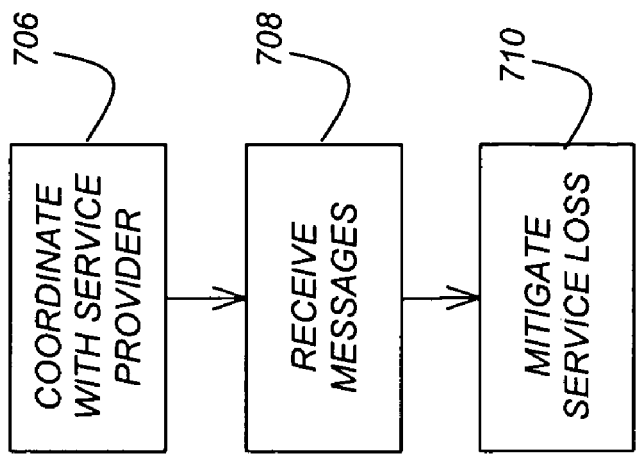
Figure 7A:
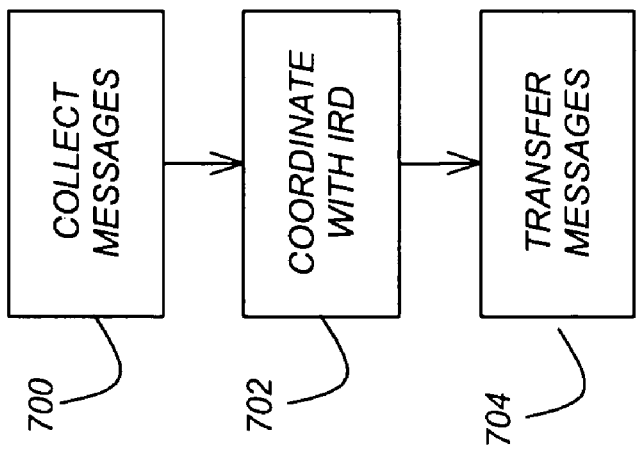

FIGS. 7A and 7B are flowcharts illustrating a method of efficiently delivering messages to individual IRDs 126 in a unidirectional, multi-channel communications system that provides parallel distribution of information to the receiving devices according to the preferred embodiment of the present invention, wherein FIG. 7A illustrates how the service provider transmits messages to the IRDs 126 and FIG. 7B illustrates how the IRDs 126 receive messages from the service provider.

Referring to FIG. 7A, Block 700 represents the service provider collecting messages for an IRD 126 prior to the next message transfer. For example, all messages received prior to the agreed-upon time may be combined into a single message for delivery to the IRD 126. In another example, delivery of unnecessary messages may be avoided altogether if the messages are required to meet certain criteria in order to be delivered, e.g., only those messages whose receipt by the IRD 126 has not been confirmed. In yet another example, content codes may be used to identify text previously stored in the IRD 126 in order to reduce the size of the messages being delivered.

Block 702 represents the service provider coordinating the agreed-upon channel and agreed-upon time of message delivery between the service provider and an IRD 126 prior to transferring the messages from the service provider to the IRD 126. Generally, the coordination is performed independently by the service provider and the IRD 126 according to one or more methods known to both the service provider and the IRD 126, wherein the methods may be updated periodically. For example, channel or time assignment may be based on unique information associated with the user or the receiving device, e.g., specific digits of the unique address of the IRD 126, a conditional access (CA) data reportback time for the IRD 126, etc. In another example, channel or time assignment may be based on a table shared between the service provider and the IRD 126, wherein the table is updated periodically. In still another example, the agreed-upon channel and/or agreed-upon time may also be identified by means of a trigger, such as a message transmitted from the service provider to the IRD 126, or the content of program materials received by the IRD 126, some other mechanism. (Note that in some embodiments, Block 702 can occur prior to Block 700.)

Block 704 represents the service provider transferring the messages to the IRD 126 only on the agreed-upon channel at the agreed-upon time, wherein each message is tagged with a unique address corresponding to the IRD 126 and then transmitted by the service provider on the agreed-upon channel with the IRD 126 filtering the agreed-upon channel to detect the address and decode its messages.

Referring to FIG. 7B, Block 706 represents the IRD 126 coordinating the agreed-upon channel and agreed-upon time of message delivery between the service provider and an IRD 126 prior to the transfer of the messages from the service provider to the IRD 126. As noted above, the coordination is performed independently by the service provider and the IRD 126 according to one or more methods known to both the service provider and the IRD 126, wherein the methods may be updated periodically. For example, channel or time assignment may be based on unique information associated with the user or the receiving device, e.g., specific digits of the address of the IRD 126, a conditional access (CA) data reportback time for the IRD 126, etc. In another example, channel or time assignment may be based on a table shared between the service provider and the IRD 126, wherein the table is updated periodically. In still another example, the agreed-upon channel and/or agreed-upon time may also be identified by means of a trigger, such as a message transmitted from the service provider to the IRD 126, or the content of program materials received by the IRD 126, or some other mechanism.

Block 708 represents the IRD 126 receiving the messages from the service provider only on the agreed-upon channel at the agreed-upon time, wherein each message is tagged with an address corresponding to the IRD 126 and then transmitted by the service provider on the agreed-upon channel with the IRD 126 filtering the agreed-upon channel to detect the address and decode its messages. Before receiving messages the IRD 126 must be tuned to the agreed-upon channel at or near the agreed-upon time either manually by the user (e.g., in response to displayed instructions instructing the user on tuning the IRD 126) or automatically by the IRD 126 (e.g., under the control of downloaded or pre-loaded software). Reliable reception may be ensured by tuning the IRD 126 to the agreed-upon channel prior to the agreed-upon time in order to ensure message delivery, e.g., tuning to the agreed-upon channel at a time X before the agreed-upon time, where X is the sum of the worst case time for tuning, lock up, etc. In addition, the IRD 126 may "listen" for messages on the agreed-upon channel for some specified time period, such as a maximum duration message including any planned repetitions. Finally, the IRD 126 may be automatically tuned back to a previous channel after message delivery is completed or the specified time period has elapsed.

Block 710 represents the IRD 126 mitigating any possible loss of services during the receipt of messages from service provider when the IRD 126 is tuned to the agreed-upon channel at the agreed-upon time. There are a number of different embodiments for mitigating any possible loss of services. (Note that in some embodiments, Block 710 can occur simultaneously with Block 708.)

In one embodiment, text, graphics, audio and/or video may be displayed by the IRD 126 while it is tuning to the agreed-upon channel at the agreed-upon time. This material may explain the message delivery process, provide unrelated entertainment, provide information related to the missed material, replace the missed material (e.g., using a previously recorded copy), etc. The material displayed by the IRD 126 may be stored on a storage device 418, such as a hard disk, as desired.

For example, the IRD 126 may display information instructing the user on preventing the IRD 126 from being tuned to the agreed-upon channel at the agreed-upon time:

"Press 'select' to STOP re-tuning to acquire your email alert messages. This process should only require X seconds."

If the user presses the "select" button, then the IRD 126 will not tune to the agreed-upon channel at the agreed-upon time; otherwise, tuning will proceed.

In another embodiment, the IRD 126 may suppress the on-screen message and/or not tune to the agreed-upon channel, if specific criteria are met. For example, the IRD 126 may be prevented from tuning to the agreed-upon channel at the agreed-upon time when the IRD 126 is scheduled to record program materials from another channel at the agreed-upon time.

In yet another embodiment, the IRD 126 may tune to the agreed-upon channel at the agreed-upon time only when the IRD 126 is receiving a specific type of information, such as promotional or advertising material. Generally, a viewer has little interest in such material, and thus does not care if the IRD 126 tunes to the agreed-upon channel.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching.

For example, while the foregoing disclosure presents an embodiment of the present invention as it is applied to a direct broadcast satellite system, the present invention can be applied to any multi-channel, unidirectional communications system that delivers messages to receiving devices. Moreover, although the receiving devices are described in terms of IRDs, any number of different receiving devices could be used instead. Finally, although specific hardware, software, logic and steps are described herein, those skilled in the art will recognize that other hardware, software, logic or steps may accomplish the same result, without departing from the scope of the present invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of efficiently delivering messages and program material from a service provider to an individual receiving device in a uni-directional, multi-channel communications system that provides parallel distribution of information from the service provider to the receiving devices, the method comprising:

transmitting the program material on a first channel;

transferring the messages from the service provider to the receiving device only on a second and agreed-upon channel at an agreed-upon time, wherein each message is tagged with an address corresponding to the receiving device by the service provider and then transmitted by the service provider to the receiving device on the second and agreed-upon channel with the receiving device filtering the agreed-upon channel to detect the address and decode its messages;

determining if the receiving device is scheduled to record program material transmitted by the service provider at the agreed upon time; and if the receiving device is not scheduled to record program material transmitted by the service provider at the agreed upon time, tuning the receiving device to the second and agreed upon channel at the agreed upon time.

2. The method of claim 1, further comprising coordinating the agreed-upon channel and the agreed-upon time of message transfers between the service provider and the receiving device prior to transferring the message from the service provider to the receiving device.

3. The method of claim 2, wherein the coordinating step is performed at any time prior to the message transfer by the service provider and the receiving device according to a method known to both the service provider and the receiving device.

4. The method of claim 3, wherein the method is based on unique information associated with a user and known to the service provider.

5. The method of claim 3, wherein the method is based on unique information associated with the receiving device and known to the service provider.

6. The method of claim 3, wherein the coordinating step is updated periodically.

7. The method of claim 3, wherein the agreed-upon channel and the agreed-upon time is based on an address of the receiver.

8. The method of claim 3, wherein the agreed-upon channel and the agreed-upon time is based on a conditional access data reportback time.

9. The method of claim 3, wherein the agreed-upon channel and the agreed-upon time is based on a table shared between the service provider and the receiver.

10. The method of claim 3, wherein the agreed-upon channel and the agreed-upon time is based on a trigger transmitted from the service provider to the receiver.

11. The method of claim 1, wherein the agreed-upon channel is identified by a message transmitted by the service provider to the receiving device.

12. The method of claim 1, wherein the agreed-upon time is identified by a message transmitted by the service provider to the receiving device.

13. The method of claim 1, further comprising combining all messages received prior to the agreed-upon time into a single message for delivery to the receiving device.

14. The method of claim 1, further comprising avoiding delivery of unnecessary messages.

15. The method of claim 14, wherein the avoiding step further comprises requiring messages to meet certain criteria in order to be delivered.

16. The method of claim 1, wherein the tuning step is performed manually by a user.

17. The method of claim 16, further comprising displaying information instructing the user on tuning the receiving device.

18. The method of claim 1, wherein the tuning step is performed automatically by the receiving device.

19. The method of claim 1, wherein the tuning step is performed prior to the agreed-upon time in order to ensure message delivery.

20. The method of claim 1, further comprising tuning the receiving device back to the first channel after message delivery is completed.

21. The method of claim 1, further comprising displaying information instructing a user on preventing the receiving device from being tuned to the agreed-upon channel at the agreed-upon time.

22. The method of claim 1, wherein the receiving device is tuned to the agreed-upon channel at the agreed-upon time when the receiving device is receiving only a specific type of information.

23. The method of claim 22, wherein the specific type of information comprises advertising or promotional information.

24. The method of claim 1, further comprising the step of displaying information to the user while the receiving device is being tuned to the agreed-upon channel at the agreed-upon time.

25. The method of claim 24, wherein the displayed information is stored on the receiving device.

26. A system for efficiently delivering messages and program material from a service provider to an individual receiving device in a uni-directional, multi-channel communications system that provides parallel distribution of information from the service provider to the receiving devices, the system comprising:

means for transmitting the program material on a first channel;

means for transferring the messages from the service provider to the receiving device only on a second and agreed-upon channel at an agreed-upon time, wherein each message is tagged with an address corresponding to the receiving device by the service provider and then transmitted by the service provider to the receiving device on the second and agreed-upon channel with the receiving device filtering the agreed-upon channel to detect the address and decode its messages;

determining if the receiving device is scheduled to record program material transmitted by the service provider at the agreed upon time: and means for tuning the receiving device to the second and agreed upon channel at the agreed upon time if the receiving device is not scheduled to record program material transmitted by the service provider at the agreed upon time.

27. The system of claim 26, further comprising means for coordinating the agreed-upon channel and the agreed-upon time of message transfers between the service provider and the receiving device prior to transferring the message from the service provider to the receiving device.

28. The system of claim 27, wherein the means for coordinating is performed at any time prior to the message transfer by the service provider and the receiving device according to a method known to both the service provider and the receiving device.

29. The system of claim 28, wherein the method is based on unique information associated with a user and known to the service provider.

30. The system of claim 28, wherein the method is based on unique information associated with the receiving device and known to the service provider.

31. The system of claim 28, wherein the method is updated periodically.

32. The system of claim 26, wherein the agreed-upon channel is identified by a message transmitted by the service provider to the receiving device.

33. The system of claim 26, wherein the agreed-upon time is identified by a message transmitted by the service provider to the receiving device.

34. The system of claim 26, further comprising means for combining all messages received prior to the agreed-upon time into a single message for delivery to the receiving device.

35. The system of claim 26, further comprising means for avoiding delivery of unnecessary messages.

36. The system of claim 35, wherein the means for avoiding further comprises means for requiring messages to meet certain criteria in order to be delivered.

37. The system of claim 26, wherein tuning is performed manually by a user.

38. The system of claim 37, further comprising means for displaying information instructing the user on tuning the receiving device.

39. The system of claim 26, wherein the means for tuning comprises the receiving device.

40. The system of claim 26, wherein the means for tuning tunes the receiver to the agreed upon channel prior to the agreed-upon time in order to ensure message delivery.

41. The system of claim 26, further comprising means for tuning the receiving device back to the first channel after message delivery is completed.

42. The system of claim 26, further comprising means for displaying information instructing a user on preventing the receiving device from being tuned to the agreed-upon channel at the agreed-upon time.

43. The system of claim 26, further comprising means for tuning the receiving device to the agreed-upon channel at the agreed-upon time when the receiving device is receiving only a specific type of information.

44. The system of claim 43, wherein the specific type of information comprises advertising or promotional information.

45. The system of claim 26, further comprising means for displaying information to the user while the receiving device is being tuned to the agreed-upon channel at the agreed-upon time.

46. The system of claim 45, wherein the displayed information is stored on the receiving device.

47. The system of claim 26, wherein the agreed-upon channel and the agreed-upon time is based on an address of the receiver.

48. The system of claim 26, wherein the agreed-upon channel and the agreed-upon time is based on a conditional access data reportback time.

49. The system of claim 26, wherein the agreed-upon channel and the agreed-upon time is based on a table shared between the service provider and the receiver.

50. The system of claim 26, wherein the agreed-upon channel and the agreed-upon time is based on a trigger transmitted from the service provider to the receiver.

* * * * *